(No Model.) 2 Sheets—Sheet 1.

G. F. WAGNER.
LAWN EDGE TRIMMER.

No. 517,942. Patented Apr. 10, 1894.

Witnesses:
John W. Achard.
Katie M. Gilligan.

Inventor:
George F. Wagner.
by
Augustus B. Stoughton
his Attorney.

(No Model.) 2 Sheets—Sheet 2.
G. F. WAGNER.
LAWN EDGE TRIMMER.
No. 517,942. Patented Apr. 10, 1894.
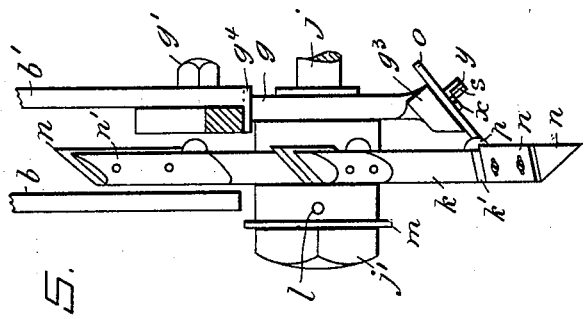
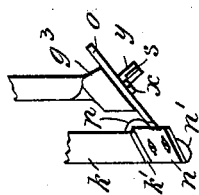
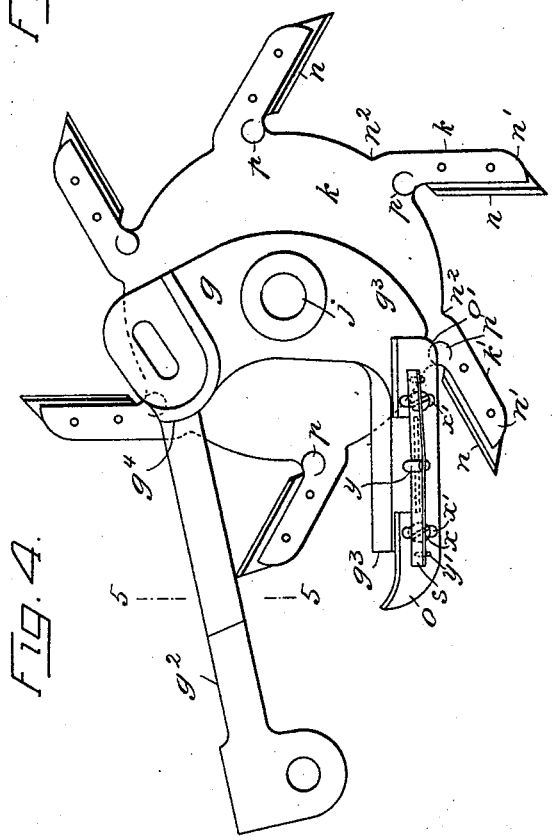
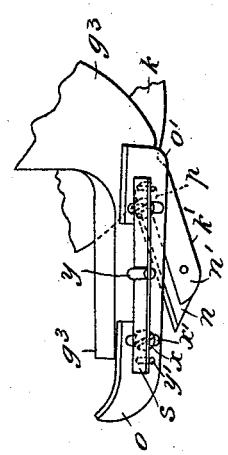
Witnesses:
John W. Achard
Katie M. Gilligan
Inventor:
George F. Wagner
by Augustus B. S. Foughton
his Attorney

UNITED STATES PATENT OFFICE.

GEORGE F. WAGNER, OF PHILADELPHIA, PENNSYLVANIA.

LAWN-EDGE TRIMMER.

SPECIFICATION forming part of Letters Patent No. 517,942, dated April 10, 1894.

Application filed April 20, 1893. Serial No. 471,193. (No model.)

*To all whom it may concern:*

Be it known that I, GEORGE F. WAGNER, a citizen of the United States, residing at the city of Philadelphia, in the county of Philadelphia and State of Pennsylvania, have invented certain new and useful Improvements in Lawn-Edge Trimmers, of which the following is a specification.

The principal objects of my present invention are, first, to provide a simple, durable, efficient, convenient and comparatively inexpensive implement or garden tool for expeditiously trimming the grass that lops or grows over the edges or borders of walks, driveways, flower beds, and the like; second, to construct and arrange the parts of the device in such manner that it may, by the removal of certain parts and the addition of other parts, be converted into and used as a sod cutter; and, third, to provide the device with durable knives that operate and cut like the blades of shears or scissors.

My invention consists in the improvements in edge trimmers hereinafter described and claimed.

The nature, objects and scope of my invention will be more fully understood from the following description taken in connection with the accompanying drawings forming part hereof, and in which—

Figure 3:
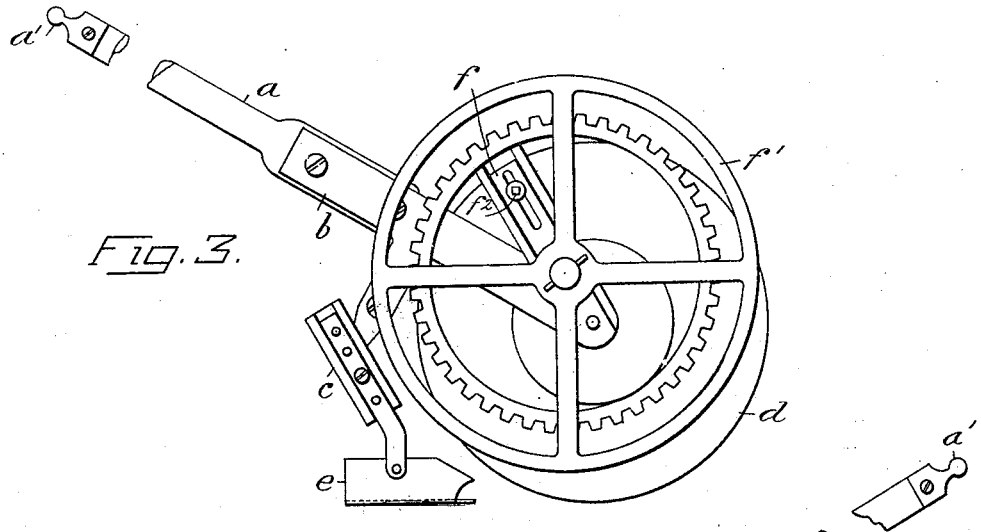
Figure 2:
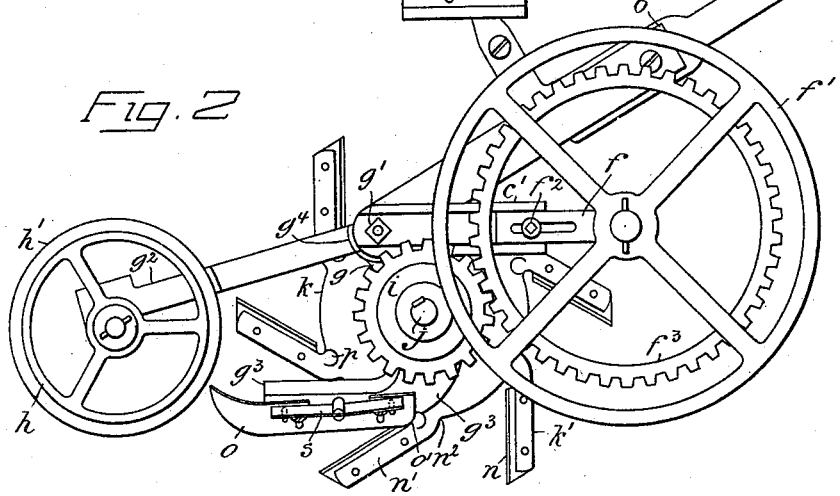
Figure 1:
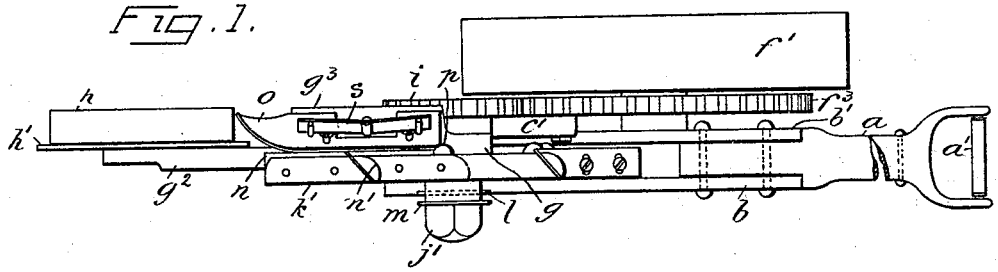

Figure 1, is a plan view of the under side of an edge-trimmer embodying features of my invention. Fig. 2, is a side elevational view of the same showing the knives. Fig. 3, is a side elevation of the machine arranged for use as a sod-cutter. Fig. 4 is a view drawn to an enlarged scale and illustrating in side elevation, the plate or frame, revoluble knives and the spring controlled knife and its accessories shown in Figs. 1 and 2. Fig. 5 is a sectional view taken on the line 5—5, of Fig. 4 showing the plate or frame attached to the handle of the machine and illustrating the spring controlled knife as pushed edgewise by a projection on the hub of the revoluble knives into position for subsequently sliding in contact with the edge of one of the revoluble knives; and Figs. 6 and 7 are respectively side and front views illustrating the position of the knives after the spring controlled knife has been released by one of the projections on the hub of the revoluble knives and while the edges of both knives are sliding in contact with each other and effecting a shearing or drawing cut.

In the drawings, $a$, is the single handle by means of which the machine is propelled. In the present instance, this handle is provided with a hand-grasp $a'$, for the accommodation of one hand of the operator, it being understood that the operator grasps the handle $a$, near the machine with his other hand.

$b$ and $b'$ are plates applied to the respective sides of the handle $a$, and provided with grooved brackets $c$ and $c'$. When the machine is used as a sod-cutter, the cutter-disk $d$ is journaled intermediate of the forwardly projecting ends of the plates $b$ and $b'$, the deliverer $e$, is attached to the bracket $c$, and the traveler $f$, to which the gage-wheel $f'$ is journaled, is secured to the bracket $c'$ by means of a bolt $f^2$. As thus arranged the machine is adapted to cut sod and embodies the subject matter of my Letters Patent No. 485,441, of November 1, 1892.

It may be remarked that the deliverer $e$, is provided with a horizontally projecting foot that operates to work under and detach the strip of sod previously severed vertically by the cutter disk $d$, as is fully shown and described in my said patent to which reference may be had for a detailed description of the deliverer.

In order to adapt the machine for cutting lopping grass, *i. e.*, the grass that hangs over the edge of walks, drives, beds, and the like, the deliverer $e$, and disk-cutter $d$, are dispensed with, the handle $a$, is turned upside down so that the bracket $c$ is at the top and the bracket $c'$ at the bottom, and the traveler $f$ is inserted into the other end of the groove of the bracket $c'$, and clamped to place by means of the set-screw $f^2$. A frame or plate $g$ Figs. 4 and 5 is adjusted to the inner face of the plate $b'$ by means of a rib $g^4$, and is thereupon bolted to place by means of a nut $g'$. This plate or frame $g$ is provided with a forwardly projecting arm $g^2$ carrying a guide wheel $h$, adapted to run upon the sod and provided with a flange $h'$ for engaging the edge of the walk, drive or bed in order to assist the operator in guiding the machine.

The plate or frame g, is also provided with a depending foot $g^3$, for a purpose to be presently described.

i, is a pinion actuated by a gear-wheel $f^3$, secured to or formed integral with the spokes of the gage-wheel $f'$. This pinion i, is keyed or otherwise attached to a shaft j, journaled in and extending through the plate or frame g.

k, is a hub provided with somewhat tangentially disposed arms $k'$, ranging obliquely across the face of the hub Fig. 7. This hub is caused to rotate with the shaft j, by means of a linch pin l, engaging in slots therein, and is held to place by means of a nut $j'$.

m, is a spring or other type of yielding washer interposed between the hub k, and nut $j'$, in order to afford the hub a slight range of movement.

n are knives detachably applied to the flattened faces of the arms $k'$. The rear edges of these arms are rounded as at $n'$, Fig. 5 and the shanks thereof are cut away as at $n^2$, Fig. 4 in order to afford proper clearance for the knives.

o, is a knife movably attached to the flattened under side of the foot $g^3$, by means of set-screws x working in slots $x'$ in the knife o.

s, is a spring secured at its intermediate portion to the under side of the foot $g^3$, by means of a split pin y and having its respective extremities in engagement with posts $y'$ on the knife o, and adapted to solicit the latter into range of the rotating knives n. In this connection it may be remarked that the intermediate portion of the rear edge of the knife o is cut away as shown partly by full and partly by dotted lines in Figs. 4 and 6 for the accommodation of the post y, and that the knife o, is supported by the spring s, and is afforded thereby a range of pivotal movement about the post y, because the shanks of the set screws x, work in the slots $x'$, in the knife and by reason of the resiliency of the spring s. However the hub k is provided with projections p, that extend into range of the beveled inner corner $o'$ of the knife o, and contact with the same Figs. 4 and 5 in order to push the inner end of the edge of the knife o, against the influence of the spring s, and clear of the inner end of the edge of each of the revolving knives n, as each of the projections p, passes out of range of the inner corner $o'$ of the knife o, the spring s holds the latter up against the edge of the corresponding revolving knife n Figs. 6 and 7 and thus insures a quick and efficient drawing cut resembling the cut of shears or scissors. It may be remarked in this connection that the edges of the revolving knives n, and spring controlled knife o are beveled in the same direction, so that the flat beveled portions of the knives slide in contact with each other, Fig. 7 whereby the knives are prevented from rapidly becoming dull.

The above described arrangement of the spring controlled knife o, is important for the reasons stated in reference to the character of the cut, and also because it compensates for any irregularity that may occur in the setting or grinding of the revoluble knives n.

The mode of operation of the hereinabove described edge trimmer is as follows:—The operator by means of the handle a, and hand-grasp $a'$, causes the gage-wheel $f'$ to travel on the sod along the edge from which the lopping grass is to be cut, and this operation is assisted by the flanged guide-wheel h, that hugs the edge of the sod. The rotation of the gage-wheel $f'$, imparts motion to the hub k, whereby the projections p are caused to first push the knife o, clear of each of the rotating knives n, Figs. 4 and 5 and to then release the same, so that its beveled edge slides along the beveled edges of each of the rotating knives Figs. 6 and 7 and thus causes all the lopping grass to be rapidly and easily cut.

Having thus described the nature and objects of my present invention, what I claim as new, and desire to secure by Letters Patent, is—

1. An edge trimmer provided with a hub having arms carrying blades, a depending foot, a spring controlled blade adapted to slide edgewise on the flattened face of said foot, a gage-wheel for rotating said hub, and projections on the hub for striking against the rear corner of the spring controlled blade, substantially as described.

2. The herein described combined tool or implement comprising a handle having brackets adapted for connection with a gage-wheel, a disk cutter and a deliverer to constitute a sod-cutter; and for connection with a plate provided with a revoluble hub having projections and carrying blades, a flanged guide-wheel and a spring controlled blade operated by said projections, to constitute an edge trimmer.

3. In an edge trimmer, a gage-wheel, a rotating hub provided with projections and with arms carrying blades and a spring controlled or pressed blade having its rear corner disposed in range of said projections and shifted thereby into position for co-operation with the blades on the arms, substantially as described.

4. In an edge trimmer a hub provided with arms and projections, blades applied to said arms and disposed obliquely of the face or curved surface of the hub, a foot depending from the machine, a spring controlled blade carried by said foot and having its rear corner disposed in range of said projections, screws and slots for connecting said spring controlled blade and foot and for permitting the former to move under the influence of said projections, and a wheel for rotating said hub through the intervention of spur gearing, substantially as described.

5. An edge trimmer provided with a hub having arms carrying blades, a foot depending from the machine and provided with a flattened and inclined face, a blade, a spring connected at its intermediate portion to said face and having its ends connected with the last mentioned blade, set screws and slots for permitting the spring pressed or controlled blade to slide on said face, projections on said hub adapted to contact with the inner corner of the spring pressed blade, a wheel for rotating said hub, and a flanged guide-wheel, substantially as described.

6. An edge trimmer comprising a handle, a frame applied to said handle and provided with a depending foot having a flattened and inclined face, a blade adapted to slide on the face of the foot, a spring secured at its intermediate portion to said foot and having its ends attached to said blade, a hub journaled to said plate and provided with rotating blades and with projections adapted to collide with the inner portion of the spring controlled blade to turn the latter about the intermediate portion of said spring clear of the inner portion of the rotating blades and to release the spring controlled blade in position for contacting with the outer portions of the rotating blades, a gage-wheel, and spur gearing interposed between the hub and gage-wheel, substantially as and for the purposes set forth.

In witness whereof I have hereunto subscribed my name.

GEO. F. WAGNER.

Witnesses:
HARRY J. WAGNER,
A. B. STOUGHTON.